(12) United States Patent
Rits

(10) Patent No.: US 8,001,378 B2
(45) Date of Patent: Aug. 16, 2011

(54) METHOD AND SYSTEM FOR PROTECTING DATA OF A MOBILE AGENT WITHIN A NETWORK SYSTEM

(75) Inventor: Maarten E. Rits, Nice (FR)

(73) Assignee: SAP AG, Walldorf (DE)

( * ) Notice: Subject to any disclaimer, the term of this patent is extended or adjusted under 35 U.S.C. 154(b) by 1124 days.

(21) Appl. No.: 11/804,696

(22) Filed: May 18, 2007

(65) Prior Publication Data

US 2007/0288751 A1 Dec. 13, 2007

(30) Foreign Application Priority Data

May 26, 2006 (EP) .................................. 06290878

(51) Int. Cl.
*H04L 9/32* (2006.01)
(52) U.S. Cl. ........ 713/168; 713/150; 713/187; 713/170; 713/171; 709/202; 709/201; 709/213; 709/217; 709/219; 380/200; 380/270; 705/50; 705/64; 719/317; 719/318
(58) Field of Classification Search .................. None
See application file for complete search history.

(56) References Cited

U.S. PATENT DOCUMENTS

| | | | | |
|---|---|---|---|---|
| 6,513,059 | B1 * | 1/2003 | Gupta et al. ..................... | 709/202 |
| 7,240,015 | B1 * | 7/2007 | Karmouch et al. ............... | 705/4 |
| 7,669,207 | B2 * | 2/2010 | Johnson .......................... | 719/318 |
| 7,827,406 | B2 * | 11/2010 | Brown et al. ................... | 713/170 |
| 2001/0016911 | A1 | 8/2001 | Obana | |
| 2002/0144118 | A1 * | 10/2002 | Maruyama ..................... | 713/170 |

(Continued)

FOREIGN PATENT DOCUMENTS

DE 10023818 A1 11/2001
(Continued)

OTHER PUBLICATIONS

"European Search Report, Application No. 06290876.9", (Sep. 29, 2006),2 pgs.
(Continued)

*Primary Examiner* — Syed A. Zia
(74) *Attorney, Agent, or Firm* — Schwegman, Lundberg & Woessner, P.A.

(57) ABSTRACT

The present description refers to a method for protecting data of a mobile agent (MA) from a first server (A) which are intended for at least one second server (B) within a network system against an attack and an unauthorized access, wherein the first server (A) as well as the at least one second server (B) have a pair of a public key (KA, KB) and a private key (PKA, PKB) associated therewith, respectively, the method comprising, starting from the first server, at least the steps of choosing an unique number (r0) and assigning it to the mobile agent (MA), choosing a secret symmetric key (SKo) and assigning it to the data (mB) to be protected, encoding the secret key (SKo) with the public key (KB) of the second server (B), encrypting the secret key (SKo) and the public key (KA) of the first server via a cryptographic wrapping function (h), thus forming a data authentication code (h(KA, SKo)), encoding the data (mB) with the secret key (SKo), and combining the unique number (r0), the encoded data ({mB}SKo) and the data authentication code (h (KA, SKo)) and encoding that combination with the private key (PKA) of the first server (A), thus forming a nested structure to be decoded successively for access to the data (mB).

33 Claims, 3 Drawing Sheets

U.S. PATENT DOCUMENTS

| | | | |
|---|---|---|---|
| 2004/0044739 A1* | 3/2004 | Ziegler | 709/213 |
| 2005/0015435 A1* | 1/2005 | Johnson | 709/202 |
| 2005/0141706 A1* | 6/2005 | Regli et al. | 380/44 |
| 2005/0289650 A1 | 12/2005 | Kalogridis | |
| 2006/0059253 A1* | 3/2006 | Goodman et al. | 709/223 |
| 2006/0227971 A1* | 10/2006 | Haddad | 380/247 |
| 2006/0242411 A1* | 10/2006 | Lin | 713/171 |
| 2007/0286424 A1* | 12/2007 | Rits | 380/270 |
| 2010/0124333 A1* | 5/2010 | Godfrey et al. | 380/270 |

FOREIGN PATENT DOCUMENTS

| | | |
|---|---|---|
| JP | 2000031958 A | 1/2000 |
| JP | 20010077858 A | 9/2002 |
| JP | 2002305513 A | 10/2002 |
| JP | 2005149205 A | 6/2005 |
| WO | WO-2004046846 A2 | 6/2004 |

OTHER PUBLICATIONS

"European Search Report, Application No. 06290878.5", (Oct. 18, 2006),2 pgs.

Ametller, S. Robles "Self-Protected Mobile Agents," AAMAS/04 Jul. 19-23, 2004, New York, New York USA—6 pages.

Hohl, Fritz, "Time Limited Blackbox Security: Protecting Mobile Agents from Malicious Hosts", *In Giovanni Vigna, Mobile Agent Security*, Springer-Verlag,(1998),92-113.

Karnik, Neeran, et al., "Security in the Ajanta mobile agent system", *In Software, Practice and Experience*, 31(4), Neeran M. Karnik and Anand R. Tripathi. Security in the Ajanta mobile agent system. Software, Practice and Experience, 31(4),(2001),301-329.

Negm, K E A, "Design, implementation and testing of mobile agent protection mechanism for MAMETS", *Computer Systems and Applications 2005, The 3rd ACS/IEEE*, (Jan. 3, 2005).

Park, Jong-Youl, "On-Time Key Generation System for Agent Data Protection," *IEICE Trans. Inf. & Syst.*, vol. E85-D, No. 3 Mar. 2002).

Roth, Volker, "On the Robustness of Some Cryptographic Protocols for Mobile Agent Protection", In *Mobile Agents : 5th International Conference*, MA 2001 Atlanta, GA, USA, Dec. 2-4, 2001 *Computer Science*, vol 2240/2001 *Book Mobile Agents : 5th International Conference*, MA 2001 Atlanta, GA, USA, Dec. 2-4, 2001. *Proceedings*, (2001),0302-9743 (Print) 1611-3349 (Online).

Sander, T, et al., "Towards Mobile Cryptography", *In Proceedings of the IEEE Symposium on Security and Privacy*, Oakland, CA, (1998).

Wilhelm, U G., et al., "Introducing Trusted Third Parties to the Mobile Agent Paradigm", *In J. Vitek and C. Jensen, Secure Internet Programming: Security Issues for Mobile and Distributed Objects*, vol. 1603, (1999),471-491.

Yee, Bennet, "Using Secure Coprocessors", *PhD Thesis*, (May 1994).

* cited by examiner

METHOD AND SYSTEM FOR PROTECTING DATA OF A MOBILE AGENT WITHIN A NETWORK SYSTEM

CLAIM OF PRIORITY

The present patent application claims the priority benefit of the filing date of European Application (EPO) No. 06290878.5 filed May 26, 2006, the entire content of which is incorporated herein by reference.

TECHNICAL FIELD

The description refers to the field of mobile agent technology, particularly to mobile agent security in network systems.

DESCRIPTION OF THE RELATED ART

In computer science, a mobile agent is a composition of computer software and data which is able to migrate from one server to another autonomously and continue its execution on a destination server. A mobile agent inherits some of the characteristics of an agent. An agent is a computational entity which acts on behalf of other entities in an autonomous fashion, performs its actions with some level of proactivity and/or reactiveness and exhibits some level of key attributes of learning, co-operation and mobility. A mobile agent, namely, is a type of a software agent, with the feature of autonomy, social ability, learning, and most important, mobility. When the term mobile agent is used, it refers generally to a process that can transport its state from one environment to another, with its data intact, and still being able to perform appropriately in the new environment. The mobile agent environment is generally spoken a software system which is distributed over a network system of heterogeneous servers. Its primary task is to provide an environment in which mobile agents can execute. The mobile agent environment is built on top of a host system. Mobile agents travel between mobile agent environments. They can communicate with each other either locally or remotely. Finally, communication can also take place between a mobile agent and a host service. Mobile agents are active in that they may choose to migrate between servers at any time during the execution. This make them a powerful tool for implementing distributed applications in a network system. During their route through the network system mobile agents can carry data with them. These data can be data that is necessary for their execution on a certain server and results from calculations that have been performing on a certain server. The route of a mobile agent can be defined in advance, or the mobile agent can adapt its route on its way based on certain events. After the completion of their tasks most mobile agents return to their departure point to return the results they gathered.

There are quite a lot of advantages of using mobile agents which are described in the following. Mobile agents reduce network traffic. Some applications first download a large amount of data from a server and then process this data to a smaller amount, e.g. search and filter applications like for example data-mining. If one would use mobile agents for these programs, then these mobile agents would be able to execute the work on the server itself, without congesting the network system because only the results of the calculation will be sent back.

Furthermore, by means of mobile agents, an asynchronous and autonomous execution on multiple heterogeneous network servers is possible. Some applications need a large amount of client-server interactions which can be done through classic client-server method invocations or with web services used in a so-called Enterprise Services Architecture (ESA). Also in this case mobile agents can be more efficient. A mobile agent can work asynchronously and autonomously while the system that sent the mobile agent is no longer connected to the network system. Mobile servers like laptops and PDAs, that mostly have an uncertain and expensive connection with relative low bandwidth, can therefore make proper use of mobile agents.

Moreover, mobile agents have the possibility to adopt themselves to changes in their execution environment. This is why mobile agents can be used for example in load-balancing. When a server is starting to become overloaded, some processes can be placed to another server within the network system in form of a mobile agent, where they can continue the execution. Also other application scenarios exist where intelligent agents can make efficient decisions based on the changing execution environment. An e-business scenario with mobile agents would allow, for example, to find the cheapest price for an airplane ticket, car rental and hotel booking. Most airlines have deals with car rental companies and hotels. This information is available when the mobile agent will visit the server of the airline company. The mobile agent will collect the prices of the airplane ticket and then continues his route to the service of cooperating car rental companies and hotels.

As already mentioned, the use of mobile agents is tolerant to network faults. Mobile agents are able to operate without an active connection between a client and a server.

Common applications of mobile agents include for example resource availability, discovery, monitoring, information retrieval, network management and dynamic software deployment.

If one wants to execute a mobile agent on a server, then this mobile agent comes under the complete control of the server. If a server has malicious intentions and wants to change the mobile agent or simply delete the mobile agent, this is impossible to prevent. However, it should be tried to make targeted, malicious changes impossible by applying detection mechanisms. With cryptographic techniques one can try to make sure that the server cannot read information that is not targeted towards him. The fact that the mobile agent travels from one server to another causes, however, that classic methods are not sufficient anymore to protect these mobile agents.

There are some existing methods to protect mobile agents against servers. Generally, there are two categories of existing methods to protect mobile agents against servers, namely so-called Blackbox methods and Partial Protection methods.

The goal of Blackbox methods is to hide the whole program code of a mobile agent for a server, so that the intention of the mobile agent is not clear and the server will not be able to make targeted modifications. There are basically three different approaches in this category.

A first approach can be called "Tamper-free Hardware". One uses here a special manufactured tool as execution environment for the mobile agents. The internal specifications of the system are physically separated from the outside world and impossible to maintain without damaging the tool, which can be easily verified. This approach gives a very good protection. However, it is practically unacceptable on a large scale because of the high manufacturing costs. For more information reference is made to "U. G. Wilhelm, S. Staamann, L. Buttyan. Introducing Trusted Third Parties to the Mobile Agent Paradigm. In J. Vitek and C. Jensen, Secure Internet Programming: Security Issues for Mobile and Distributed Objects, volume 1603, pages 471-491. Springer-Verlag, New York, N.Y., USA, 1999" and "Bennet Yee. Using Secure Coprocessors. PhD Thesis, May 1994".

A further approach can be called "Obfuscated Code". This approach tries to rearrange the code of the mobile agent in such a way that it becomes incomprehensible, but still has the same effect. The technique is closely related to obfuscation techniques to prevent reverse engineering. At this moment there is no method that makes the code incomprehensible infinitely in time. If one has enough processing capacity, one can rediscover the signification of the code. A less strict variant of this approach is the time limited protection, i.e. the obfuscated code is only valid for a certain period in time, after that the mobile agent becomes invalid. A large problem here is that one has not yet defined ways to calculate the effectiveness of the obfuscation algorithms. In other words, it is not possible to calculate an underlimit for the time. More information can be found in "Fritz Hohl. Time Limited Blackbox Security: Protecting Mobile Agents from Malicious Hosts. In Giovanni Vigna, Mobile Agent Security, pages 92-113. Springer-Verlag. 1998".

A further approach refers to Mobile Cryptography. Suppose one has an algorithm to calculate a function f and one wants to know from a certain input value x the function value f(x) on a server without the server knowing f. This would be possible if one could encrypt f in a way that E[f(x)], the function value of x calculated with the encrypted function, could be decrypted back to f(x). This technique is very promising, but the biggest challenge remains to develop encryption schemas E for arbitrary functions f. For now E exists only for certain classes of polynomials and rational functions as it is described in reference "T. Sander and C. Tschudin. Towards Mobile Cryptography. In Proceedings of the IEEE Symposium on Security and Privacy, Oakland, Calif., 1998".

Instead of covering the whole mobile agent for the servers in the approach of partial protection, part of the mobile agent will be protected, like confidential information that the mobile agent carries with him. In this case, however, the servers can perform targeted attacks against the mobile agents, which was not possible with blackbox methods. The mobile agents are vulnerable to so-called cut-and-paste attacks. One can remove data from a mobile agent and use another mobile agent to get to know the confidential information.

In the following, such a partial protection method which is still vulnerable to a cut-and-paste attack will be described. The purpose of the existing method described in the following and further described in reference "Neeran M. Karnik and Anand R. Tripathi. Security in the Ajanta mobile agent system. Software, Practice and Experience, 31(4): 301-329, 2001", is to make data that the mobile agent carries with him only accessible to certain servers. It is assumed in the following that the servers within the network system are all provided with a pair of a public key and a private key, respectively. One could try to make data that a mobile agent carries with it only accessible to certain servers by encrypting those data with the respective public keys of the servers. To check the integrity and the authenticity of the data one can then also calculate a digital signature on the whole. This can be described by the following mathematical term:

$$[\{m1\}K1,\ldots,\{mn\}Kn]PKA \qquad (1)$$

wherein mi being a message for a server i, Ki the public key of server i and PKA the private key of the owner of the respective mobile agent, namely server A.

When a mobile agent arrives on a certain server, this server verifies first the signature on the whole data structure with the public key of the agent owner. After this step, the server checks if the mobile agent carries messages that are destined for that server. If this is the case, the respective server can decrypt these messages with its private key and makes them available to the mobile agent, if appropriate.

This described method makes use of classic cryptographic techniques to protect the data of the mobile agent. However, because the mobile agents migrate from one server to another before returning to their home server, the mobile agents need additional protection. This will become clear from the description of the following attack.

To clarify the attack described in the following, the assumption is made that the mobile agent only carries one message. The server owning the mobile agent as well as each server within the network system is associated with a pair of a public key and a private key, respectively. Suppose that a server A wants to send a secret message to a server B via a network system. Server A encrypts this secret message with the public key of server B. Then server A sends a mobile agent on its way through the network system to the respective server B. For simplicity it is assumed in the following that the mobile agent only consists of its program code PA and its container containing the message. It is assumed further that the mobile agent first arrives on a server of user E on its way to server B. This scenario can be described as follows:

$$A=>E:PA,[\{mB\}KB]PKA \qquad (2)$$

wherein PA is the program code of the mobile agent, mB is the secret message for server B, KB is the public key of server B and PKA is the private key of server A as the owner of the mobile agent.

Server E can in this situation just remove the private key as the signature of server A, put the encrypted message mB in its own agent and sign the whole data container with its own private key PKE. Then server E can send the mobile agent to server B which can be described as follows:

$$E=>B:PE,[\{mB\}KB]PKE,$$

$$B:PE,[\{mB\}KB]PKE=>\{\{mB\}KB\}PKB=mB \qquad (3)$$

wherein PE describes the program code of the mobile agent owned by server E and PKE describes the signature, namely the private key of server E as the owner of the new mobile agent.

Server B decrypts unaware of server E's intents the message mB and makes it available to the actual mobile agent. If server E programs its mobile agent's code PE in a way that it keeps track of the message mB, then server E has full access to this secret message mB when the mobile agent returns back to server E which can be described as follows:

$$B=>E:PE,[\{mB\}KB]PKE,mB \qquad (4)$$

It would be desirable now to find a possibility to avoid such kind of attacks completely.

DETAILED DESCRIPTION

Figure 1:
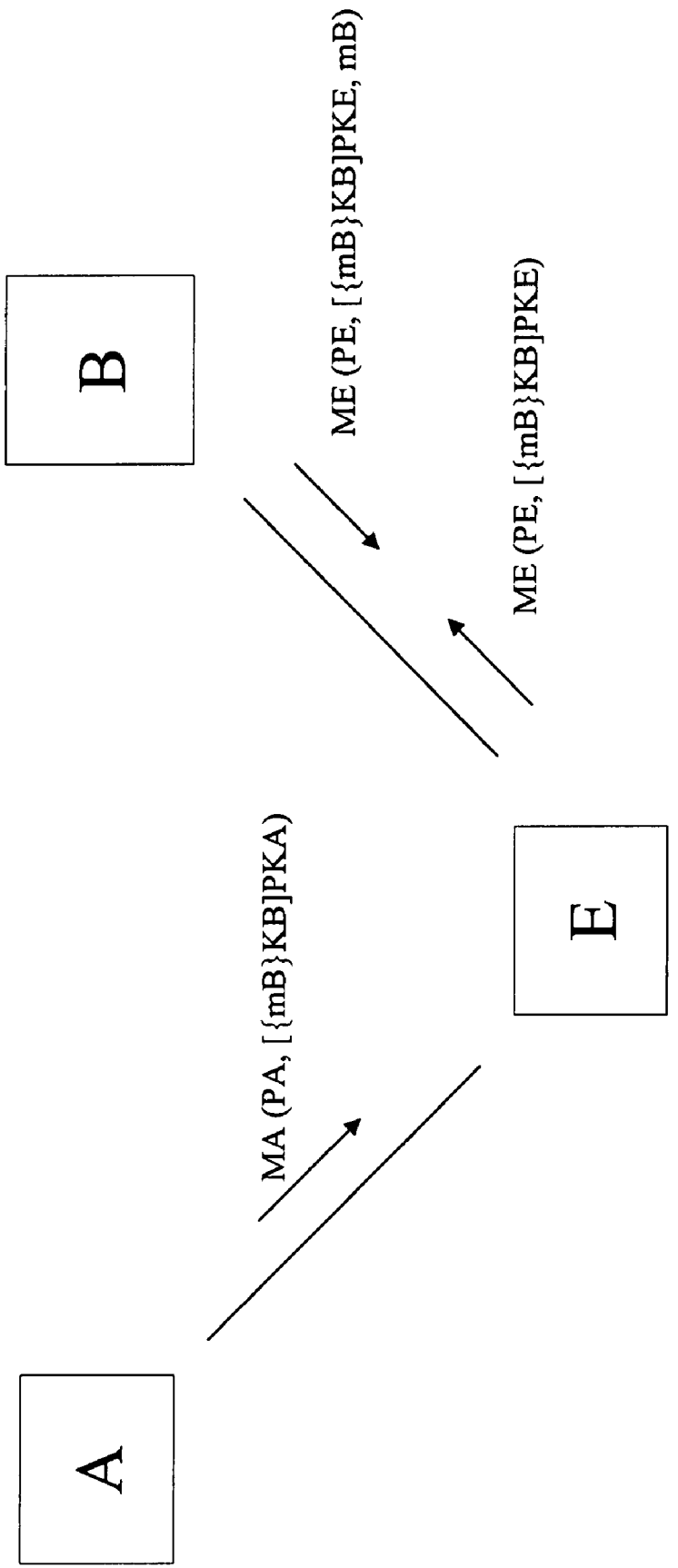
FIG. 1 shows a possible scenario of a data transfer by a mobile agent which may be vulnerable to an attack as it is known from the prior art.

According to one aspect, a method is provided for protecting data of a mobile agent from a first server which are intended for at least one second server within a network system against an attack and an unauthorized access, wherein the first server as well as the at least one second server are associated with a pair of a public key and a private key, respectively. The method comprises, starting from the first server, at least the following operations:
- choosing an unique number and assigning it to the mobile agent,
- choosing a secret symmetric key and assigning it to the data to be protected,
- encoding the secret key with the second server's public key,
- encrypting the secret key and the first server's public key via a wrapping function, thus forming a data authentication code,
- encoding the data with the secret key, and
- combining the unique number, the encoded data, the encoded secret key and the data authentication code and encoding that combination with the first server's private key, thus forming a nested structure to be decoded successively for access to the data.

According to another aspect, a network system comprises at least one second server and at least one mobile agent from a first server carrying data which are intended for the at least one second server, wherein the first server as well as the at least one second server are associated with a pair of a public key and a private key, respectively, and the mobile agent is configured to provide the data within a nested structure which is encoded with the first server's private key and would have to be decoded by the at least one second server for access to the data, the nested structure being built up on a combination of a unique number assigned to the mobile agent, a secret symmetric key which is assigned to the data to be protected and encoded with the second server's public key, a data authentication code formed by an encryption of the secret key and the first server's public key via a wrapping function, and the data encoded with the secret key.

Implementations may include one or more of the following. According to a possible embodiment of the method, the wrapping function is chosen as a hash function. A hash function or hash algorithm can be described as a way of creating a small digital fingerprint from any kind of data. The hash function drops and mixes the data to create the fingerprint, often called a hash value. The fundamental property of all hash functions is that if two hash values according to the same hash function are different then the two inputs are different in some way. This property is a consequence of hash functions being deterministic. A well designed cryptographic hash function is a "one-way-operation". That means that there is no practical way to calculate a particular data input that will result in a desired hash value so it is also very difficult to forge it. Functions intended for cryptographic hashing, such as for example MD5, are commonly used as so-called stock hash functions. As used here, a cryptographic hash function is a hash function with certain additional security properties to make it suitable for use for authentication and message integrity. Broadly speaking, a cryptographic hash function should behave as much as possible like a random function while still being deterministic and efficiently computable. Such hash functions are for example MD5 and SHA-1.

According to a further embodiment of the method, the nested structure to be decoded for access to the data is defined as follows:

$$[PA,r0,\{SKo\}KB,h(KA,SKo),\{mB\}SKo]PKA \quad (5)$$

wherein PA is a agent's program code, r0 is the unique number, SKo is the secret key, KB is the second server's public key, h is the wrapping function, such as a hash function, KA is the first server's public key, PKA is the first server's private key and mB is the data to be protected.

Coming back to the exemplary attack mentioned before, the same scenario can be described and the attack as described before can be avoided by means of the method according to a possible implementation as follows:

When the mobile agent arrives at a server of user B, user B verifies first the private key associated with the mobile agent, representing at the same time a signature from a user A as the owner of the mobile agent on the whole data structure which has been received by the server of user B. Then user B decrypts the secret symmetric key, called here SKo, with his private key, called here PKB. Then user B checks the message authentication code, that means the hash function value h of the public key KA from user A, namely the public key associated with the mobile agent, and the secret symmetric key SKo. Finally user B decrypts the message mB and makes it available to the mobile agent.

The attack described before is not possible anymore since user E does not know the secret symmetric key SKo and cannot forge the hash value h(KA, SKo). User E can remove again the signature of user A, namely the private key PKA associated with the mobile agent and can replace it by its own private key PKE. Furthermore, user E can replace the mobile agent code of user A by the mobile agent code of its own agent represented by PE. Therefore, user E can send to user B the following:

$$E=>B:[PE,r0,\{SKo\}KB,h(KA,SKo),\{mB\}SKo]PKE \quad (6)$$

Since the public key KA does not match with the private key PKE of user E with which user E signed the data structure, the verification of the hash function value h(KA, SKo) by user B will fail and user B will not decrypt the message mB and thus does not make it available to the mobile agent of user E.

According to a further possible embodiment of the method, the unique number is used only once and is calculated on basis of a program code of the mobile agent. Therefore, the data structure contains a unique number, in above mentioned case called r0, that will be used only once and is calculated on the basis of the program code of the mobile agent, represented in the above mentioned case by PA. Every time a user sends out a new mobile agent the user changes that unique number. This number is introduced because if not, it is possible that an old mobile agent of a specific user can be reused. If user A for example sends out a mobile agent to change data about him that are kept at user B, then someone would be able to reuse an old mobile agent of user A to change the data back into the old data.

It is possible that user B maintains a list of numbers that have already been used. Therefore, user B has a control that no number can be reused, and therefore, an already used agent cannot be reused again.

According to a further possible embodiment of the method, the program code of the agent is maintained in a Java Archive file. Furthermore, it is possible that that Java Archive file is signed by the private key associated with the mobile agent which is the private key of the mobile agent's owner.

It is also possible that the Java Archive file contains the unique number assigned to the mobile agent.

The complete structure to be decoded can be defined as follows:

$$[PA,r0]PKA+[r0,\{SKo\}KB,h(KA,SKo),\{mB\}SKo]\\PKA \quad (7)$$

wherein PA is an agent's program code, r0 is the unique number, SKo is the secret symmetric key, KB is the second server's public key, h is the wrapping function, KA is the first server's public key, PKA is the first server's private key and mB is the data to be protected. The reason why the Java Archive file may also contain the unique number is because the agent's program code and the value of the objects, i.e. the data of the mobile agent, can be serialized separately in existing agent platforms.

As already indicated above, the at least one second server registers the unique number in a list of numbers thus keeping a check on the numbers that have already been used.

As already mentioned above, in another aspect, a network system comprises at least one second server and at least one mobile agent from a first server carrying data which are intended for the at least one second sever, wherein the mobile agent is configured to provide the data within a nested structure which has to be unwrapped successively in order to verify the authentication of the mobile agent before decrypting the data. Implementations may include one or more of the following. In a possible embodiment of the network system, the nested structure can be computed by an agent's owner, namely the first server, which sends the mobile agent out.

Furthermore, it is possible that the complete data structure also contains a unique number that will be used only once and is calculated on the basis of a code of the respective mobile agent. Every time the agent's owner sends out a new agent he changes the number. This unique number is introduced in order to avoid a possible reuse of an old mobile agent. If an owner for example sends out a mobile agent to change data about him that are kept at a certain server, then someone would be able to reuse an old mobile agent of that owner to change data back into the old data. The at least one server to which the mobile agent is sent, is able to register the unique number in a list of numbers thus keeping a check on the numbers that have already been used.

As already mentioned before, the wrapping function can be a hash function which has been explained in detail before. The message structure to be decoded for access to the data can be defined as follows:

$$[PA,r0,\{SKo\}KB,h(KA,SKo),\{mB\}SKo]PKA \qquad (8)$$

wherein PA is the agent's program code, r0 is the already mentioned unique number, SKo is the secret key, KB is the second server's public key, h is the wrapping function, KA is the public key associated with the mobile agent, PKA is the private key associated with the mobile agent and mB is the data to be protected. It is possible that the program code of the mobile agent is maintained in a Java Archive file which can also be signed by the private key of the agent's owner, i.e. the private key of the first server. Furthermore, it is possible that the Java Archive file also contains the unique number which is assigned to the mobile agent.

The complete structure to be decoded can be defined as follows:

$$[PA,r0]PKA+[r0,\{SKo\}KB,h(KA,SKo),\{mB\}SKo]\\PKA \qquad (9)$$

wherein PA is again the agent's program code, r0 is the unique number, SKo is the secret key, KB is the second server's public key, h is the wrapping function, KA is the public key of the agent's owner, i.e. the public key of the first server, PKA is the private key of the agent's owner, i.e. the private key of the first server, and mB is the data to be protected. It is possible within a further embodiment of the system that the agent's program code and the data of the agent are serialized separately.

According to another aspect, a mobile agent from a first server is provided which is configured for providing a protected transfer of data which are intended for at least one second server within the network system. The first server as well as the at least one second server are associated with a pair of a public key and a private key, respectively. The mobile agent is configured to provide the data within a nested structure which is encoded with the first server's private key and which has to be decoded by the at least one second server for access to the data, the nested structure being built up on a combination of a unique number assigned to the mobile agent, a secret symmetric key which is assigned to the data to be protected and encoded with the second server's public key, a data authentication code formed by an encryption of the secret key and the first server's public key via a wrapping function and the data encoded with the secret key.

Implementations may include one or more of the following. In one possible embodiment of the mobile agent, the nested structure can be computed by an agent's owner which sends the mobile agent out, i.e. by the first server. It is possible that the wrapping function is a hash function. The nested structure to be decoded for access to the data can be defined, as already mentioned before, as follows:

$$[PA,r0,\{SKo\}KB,h(KA,SKo),\{mB\}SKo]PKA \qquad (10)$$

wherein PA is the agent's program code, r0 is the unique number, SKo is the secret key, KB is the second server's public key, h is the wrapping function, KA is the first server's public key, PKA is the first server's private key and mB is the data to be protected.

In a further embodiment of the mobile agent, the unique number is used only once and is calculated on basis of the program code of the mobile agent. That program code of the mobile agent can be maintained in a Java Archive file which can further be signed by the first server's private key. Furthermore, it is possible that the Java Archive file also contains the unique number assigned to the mobile agent.

As already mentioned before, the complete structure to be decoded can be defined as follows:

$$[PA,r0]PKA+[r0,\{SKo\}KB,h(KA,SKo),\{mB\}SKo]\\PKA \qquad (11)$$

wherein PA is the agent's program code, r0 is the unique number, SKo is the secret key, KB is the second server's public key, h is the wrapping function, KA is the first server's public key, PKA is the first server's private key and mB is the data to be protected. It is also possible, as already indicated before, that the agent's program code and the data of the agent are serialized separately.

According to a further aspect, there is provided a computer program product with a computer-readable medium and a computer program stored on the computer-readable medium with a program code which is suitable for carrying out a method according to any implementation when the computer program is run on a computer.

In another aspect, a computer program with a program code is provided which is suitable for carrying out a method according to any implementation and a computer-readable medium with a program stored thereon, the computer program comprising a program code, which is suitable for carrying out a method according to any implementation when the computer program is run on a computer.

Implementations can be used in an e-business scenario for travel management for example on top of a so-called NetWeaver™ platform. When someone wants to plan a trip, he first checks the web pages of some airline companies for the price of a flight, to pick the cheapest one out. Besides that airplane ticket one would also need to rent a car and a hotel for the trip. In reality, most airline companies have special deals with hotels and car rental services. The check for the cheapest combination of an airplane ticket, hotel and car rental is very time consuming for most people. By using a mobile agent, it is possible to automate this search. It is needed a mobile agent that carries the data of the trip with it and looks on the different agent-enabled NetWeaver™ platforms for the needed information. Data that are sensitive for customers can now be protected by using an embodiment of the method, or by using an embodiment of the mobile agent. Data which are sensitive for customers can be for example credit card information, fidelity numbers, etc.

Further features and embodiments will become apparent from the description and the accompanying drawings.

For the purpose of clarity, the present discussion refers to an abstract example of a network system. However, implementations of the method and the system may operate with a wide variety of types of network systems including networks and communication systems dramatically different from the specific example as illustrated in the following drawings.

It should be understood that while details of one or more implementations are described in terms of a specific system, further implementations may have applications in a variety of communication systems, such as advanced cable-television systems, advanced telephone-networks or any other communication systems that would benefit from the system or the method. It is intended that the system as used in this specification and claims is realizable within any communication system unless the context requires otherwise.

Implementations are schematically illustrated in the drawings by way of an example embodiment and explained in detail with reference to the drawings. It is understood that the description is in no way limiting and is merely an illustration of various implementations.

FIG. 1 shows a possible scenario of a data transfer by a mobile agent within a network system as it is known from the prior art. In the case described here the user of server A wants to send a secret message mB to a user of a server B by using a mobile agent MA. Mobile agent MA passes on its route through the network system a further server E. Server E, however, should not be authorized to read the secret message which server A wants to send to server B by using the mobile agent MA. Therefore, it has to be made sure that server E cannot read information that is not targeted towards him. In the case shown here, a partial protection method is used to protect a part of the mobile agent MA as the secret message mB that the mobile agent MA carries with it. The use of such a partial protection method instead of a Blackbox method, however, makes it possible, that a server like server E can perform targeted attacks against the mobile agent MA which is not possible with a Blackbox method. The mobile agent MA is vulnerable to so-called "cut-and-paste" attacks. In order to make data, such as the secret message mB that the mobile agent MA carries with it, only accessible to certain servers, such as server B, the secret message mB can be encrypted. Such an encryption can be made by a public key KB of server B for which the secret message mB is intended. To check the integrity and the authenticity of the secret message mB it is also possible to calculate the digital signature on the whole data. This can be realized by encrypting the whole data which is carried by the mobile agent MA by a private key which is associated with the mobile agent MA, such as the private key PKA of server A. This can be described by the following formula:

[{mB}KB]PKA wherein mB is the secret message for server B, KB is the public key of server B and PKA is the private key of the owner of the mobile agent MA, namely of server A.

When the mobile agent MA arrives on its route through the network system on server B, server B verifies first the signature on the whole data with the public key KA of the mobile agent owner A. After this step, server B checks if the mobile agent MA carries messages that are destinated for him. If this is the case, server B decrypts these messages with its private key PKB and makes them available to the mobile agent MA, if appropriate.

In the example shown here use of classic cryptographic techniques is made in order to protect the data of the mobile agent MA. However, because the mobile agent migrates among several servers within the network system before returning to its home server A, the mobile agent MA needs additional protection as it will become clear when regarding the following attack.

As described above, server A encrypts the secret message mB with the public key KB of server B and sends the mobile agent MA on its way. For simplicity it is assumed here that the mobile agent MA only consists of its program code PA and its data container containing the message mB which can be described as (PA, [{mB}KB]PKA). It is supposed here that the mobile agent MA first arrives on server E which can be described as follows:

A=>E:PA,[{mB}KB]PKA

Server E can just remove now the signature of server A, namely the private key PKA of server A, put the encrypted secret message {mB}KB on its own mobile agent ME and sign the data container with its own private key PKE. Then server E sends its mobile agent ME to server B which can be described as follows:

E=>B:PE,[{mB}KB]PKE wherein PE is a program code of the mobile agent ME and PKE is the private key of server E. Server B decrypts unaware of the intents of server E the message mB and makes it available to the mobile agent ME. If for example server E programs its agent code PE in a way that keeps track of the secret message mB, then server E has full access to this secret message mB when the mobile agent ME returns to server E:

B=>E:PE,[{mB}KB]PKE,mB

Therefore, the secret message mB is easily accessible to an unauthorized server E although it has been encrypted with the public key KB of server B and further being signed by the private key PKA of server A.

Figure 2:
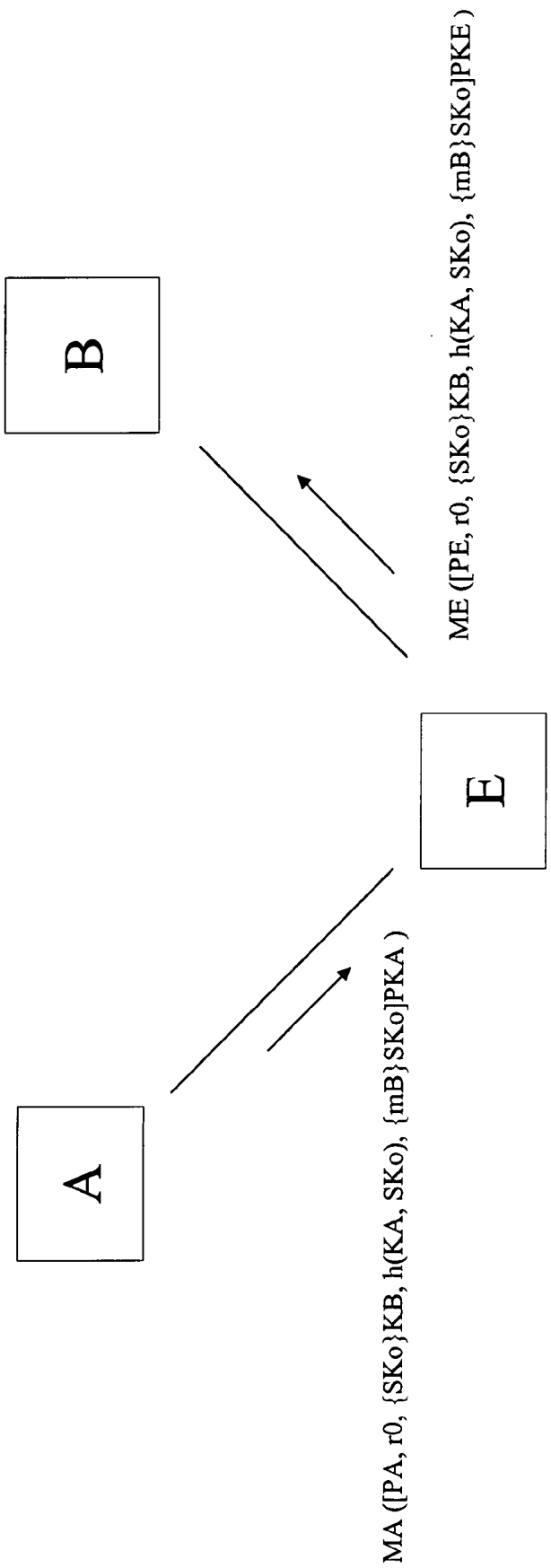
FIG. 2 shows a possible scenario of a data transfer by a mobile agent as it can be realized within a possible embodiment of a system according to one implementation.

FIG. 2 shows a possible scenario of a data transfer by a mobile agent as it can now be realized within a possible embodiment of a system according to one aspect. The scenario shown in FIG. 2 shows again a server A, a server E and a server B. For simplicity and for comparison it is again assumed that the mobile agent MA is only carrying one secret message mB intended for server B. It is further assumed that each of the servers A, B and E have their own pair of a private key and a public key, respectively. That means that server A has a public key KA and a private key PKA, server B has a public key KB and a private key PKB and server E has a public key KE and a private key PKE. Moreover, the mobile agent MA has again a program code PA. Before sending the mobile agent MA on its way from server A to server B through the network system, server A constructs its mobile agent MA in the following way:

[PA,r0,{SKo}KB,h(KA,SKo),{mB}SKo]PKA wherein r0 is an arbitrary unique number, SKo is a secret symmetric key and h is a cryptographic hash function. Such a hash function is a one-way-operation, which means that there is no practical way to calculate a particular data input that will result in a desired hash value so it is also very difficult to forge it.

When the mobile agent MA arrives at server B, server B verifies first the private key, namely the signature from server A on the whole data structure. Then server B decrypts the secret symmetric key SKo with its private key PKB. Then server B checks the message authentication code, namely the hash value of the public key KA from server A with the secret symmetric key SKo. Finally server B decrypts the message mB and makes it available to the mobile agent MA.

In the scenario described here it is easily to recognize that the attack described with respect to FIG. 1 is not possible anymore since server E does not know the secret symmetric SKo and cannot forge the hash value h(KA, SKo). Server E can only remove the signature of server A and replace it by its own signature, namely by its private key PKE. Furthermore, server E can replace the program code of the mobile agent MA by the program code PE of its own mobile agent ME. The data structure which can be sent from server E to server B can be described as follows:

E=>B:[PE,r0,{SKo}KB,h(KA,SKo),{mB}SKo]PKE

Since the public key KA of server A does not match with the private key PKE of server E with which server E signed the data structure the verification of the hash value h(KA, SKo) of server B will fail and it will not decrypt the message mB. Therefore, the mobile agent ME of server E has no access to the secret message mB.

As described before, the data structure also contains the unique number r0 that will be used generally only once and is calculated on the basis of the program code PA of the mobile agent MA. Every time server A sends out a new mobile agent server A changes that number r0. This number r0 is introduced because if not, one can reuse an old mobile agent. If server A, for example, sends out a mobile agent to change data about server A that are kept at server B then someone would be able to reuse an old mobile agent of server A to change the data back into the old data. Server B maintains a list of numbers that have already been used in order to check if the mobile agent arriving at him from server A is a new one.

Practically the program code PA of the mobile agent MA is maintained in a Java Archive file JAR. Before the mobile agent MA is sent on its route, this JAR will be signed with the private key of the server A. Except for the class files of the mobile agent MA the JAR also contains the unique number r0. This can be implemented as follows:

[PA,r0]PKA+[r0,{SKo}KB,h(KA,SKo),{mB}SKo]PKA

The reason why the program code also contains the unique number is because the program code of the mobile agent and the value of the data objects are serialized separately in most existing agent platforms.

Figure 3:
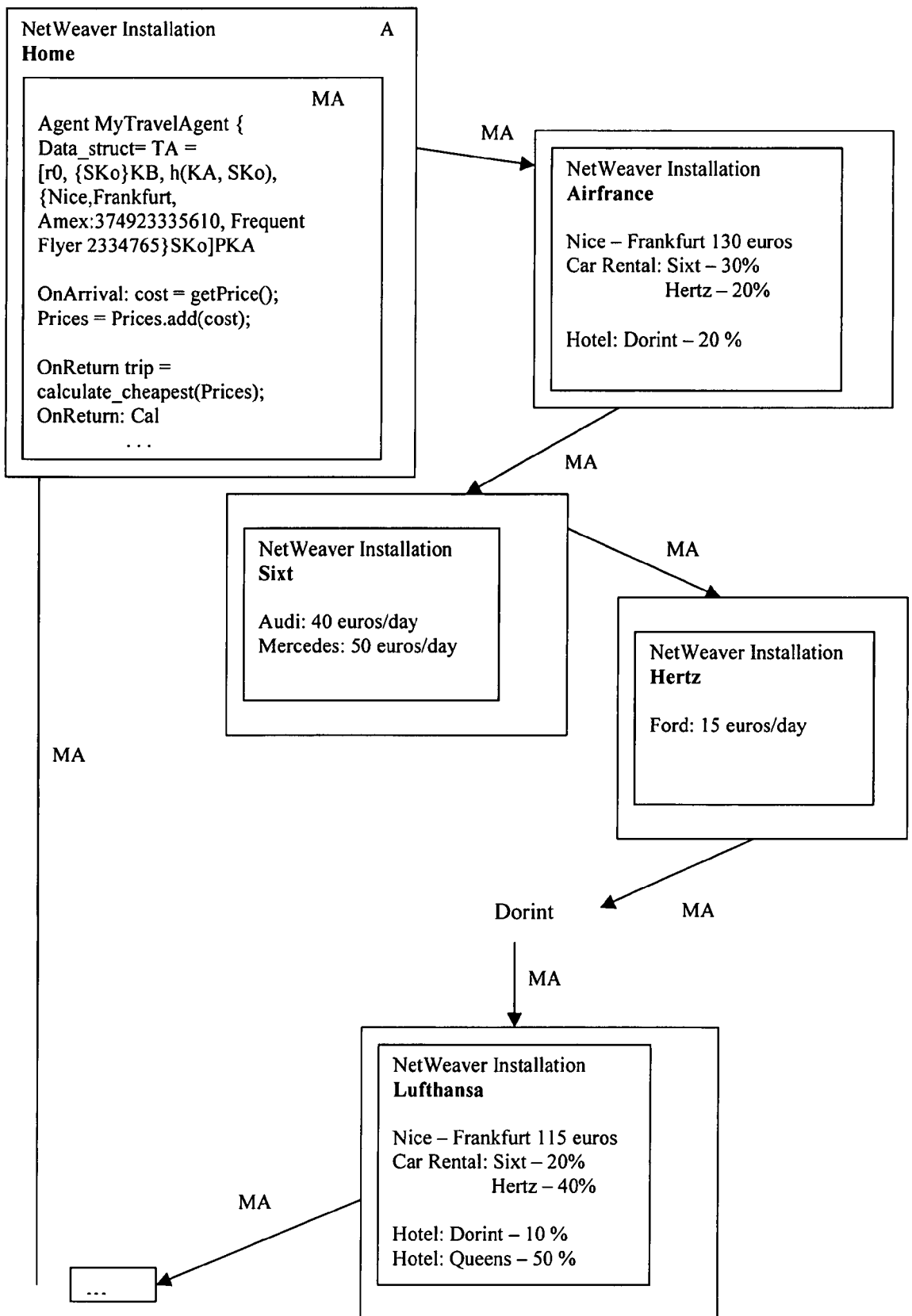
FIG. 3 shows an e-business scenario in which an embodiment of a mobile agent according to another implementation can be used.

FIG. 3 shows a specific e-business scenario for a travel management on top of a so-called NetWeaver™ platform. It is assumed that someone wants to plan a trip. In this case he first checks the web pages of some airline companies for the price of the flight he wants to do to pick out the cheapest one. In the case shown here the traveler constructs by means of his server A a mobile agent MA called here "MyTravelAgent". The data structure which is carried by the mobile agent MA corresponds here to:

TA=[r0,{SKo}KB,h(KA,SKo),{Nice, Frankfurt, Amex:374923335610, Frequent Flyer 2334765}SKo]PKA wherein r0 is a unique number, SKo is a secret symmetric key, KA is a public key and PKA a private key of server A as the home server of the traveler. The data which is carried by the mobile agent MA and which should be not accessible to any server within the network is {Nice, Frankfurt, Amex: 374923335610, Frequent Flyer 2334765} since those data are sensitive for the traveler, particularly for example a credit card information and further fidelity numbers. The mobile agent MA migrates now from one server to another in order to get enough information for the trip to be planned by the traveler. Besides an airplane ticket the traveler would also need to rent a car and a hotel for the trip. In reality most airline companies have special deals with hotels and car rental services. The check for the cheapest combination of airplane ticket, hotel and car rental is too time consuming for most travelers. By using the mobile agent MA the traveler can automate this search. The mobile agent MA looks now on its route through the network system on the different agent enabled NetWeaver™ platforms for the needed information. First mobile agent MA visits the server of the airline company Airfrance. He gets here some information about a price of a flight from Nice to Frankfurt which is about 130 euros and further information about special deals the airline Airfrance has with the hotel Dorint and with car rental services Sixt and Hertz. Then the mobile agent MA migrates further to the server of the car rental service Sixt and gets here information about different cars and the corresponding rental costs, namely about Audi which costs 40 euros per day and Mercedes which costs 50 euros per day. The mobile agent MA collects all this information and migrates further to the server of the car rental service Hertz where it gets the information about the rental costs of Ford which costs 15 euros per day. With all this collected information the mobile agent MA travels further to the server of the hotel Dorint in order to get now the complete information for a trip when it is made by using the airline Airfrance and one of the hotels and car rental services with which the airline company Airfrance has special deals.

In order to get information about an alternative airline company, the mobile agent travels further through the network to the server of the airline company Lufthansa. On this server it gets information about the flight from Nice to Frankfurt which costs about 115 euros. The Lufthansa company has a deal with the car rental services Sixt and Hertz and with the hotels Dorint and Queens. The mobile agent MA can get now more information on the respective servers of the car rental services and the hotels in order to get a complete statement of costs for the traveler when either using the airline company Airfrance or the airline company Lufthansa. Finally, the mobile agent MA returns back to its home server A with a detailed catalogue of statements of costs about different alternatives for planning the trip from Nice to Frankfurt. In order to avoid that the mobile agent MA is vulnerable to so-called cut-and-paste attacks when the mobile agent MA migrates from one server to another the data it carries with it, particularly the sensitive data of the traveler, as for example the credit card information and further fidelity numbers, are protected as proposed by term TA. Thus, no unauthorized server can get access to the sensitive data of the traveler.

The invention claimed is:

1. A method for protecting data of a mobile agent (MA) from a first server(A) which are intended for at least one second server(B) within a network system against an attack and an unauthorized access, wherein the first server(A) as well as the at least one second server (B) have a pair of a public key (KA, KB) and a private key (PKA, PKB) associated therewith, respectively, the method comprising:

choosing a unique number (r0) and assigning it to the mobile agent (MA);

choosing a secret symmetric key (SKo) and assigning it to data (mB) to be protected;

encoding the secret key (SKo) with the public key (KB) of the second server (B);

encrypting the secret key (SKo) and the public key (KA) of the first server via a wrapping function (h), thus forming a data authentication code (h(KA, SKo));

encoding the data (mB) with the secret key (SKo);

combining the unique number (r0), the encoded data ({mB}SKo), the encoded secret key({SKo}KB) and the data authentication code (h(KA, SKo)); and encoding that combination with the private key (PKA) of the first server (A) to form a nested structure to be decoded successively for access to the data (mB).

2. The method according to claim 1, wherein the wrapping function is chosen as a hash function.

3. The method according to claim 1, wherein the nested structure to be decoded for access to the data is defined as follows:

[PA,r0,{SKo}KB,h(KA,SKo),{mB}SKo]PKA wherein PA is a agent's program code, r0 is the unique number, SKo is the secret key, KB is the second server's public key, h is the wrapping function, KA is the first server's public key, PKA is the first server's private key and mB is the data to be protected.

4. The method according to claim 1, wherein the unique number (r0) is used only once and is calculated on basis of a program code (PA) of the mobile agent(MA).

5. The method according to claim 4, wherein the program code (PA) of the mobile agent (MA) is maintained in a Java Archive file (JAR).

6. The method according to claim 5, wherein the Java Archive file (JAR) is signed by the first server's private key (PKA).

7. The method according to claim 5, wherein the Java Archive file (JAR) contains the unique number (r0) assigned to the mobile agent (MA).

8. The method according to claim 4, wherein the complete structure to be decoded is defined as follows:

[PA,r0]PKA+[r0,{SKo}KB,h(KA,SKo),{mB}SKo]PKA wherein PA is the agent's program code, r0 is the unique number, SKo is the secret key, KB is the second server's public key, h is the wrapping function, KA is the first server's public key, PKA is the first server's private key and mB is the data to be protected.

9. The method according to claim 4, wherein the agent's program code (PA) and the data (mB) of the agent are serialized separately.

10. The method according to claim 1, wherein the unique number (r0) can be used by the at least one second server (B) for registration in a list of numbers, thus keeping a check on the numbers that have already been used.

11. A network system comprising:

at least one second server (B); and at least one mobile agent (MA) from a first server (A) carrying data (mB) which are intended for the at least one second server (B), the first server as well as the at least one second server being associated with a pair of a public key (KA, KB) and a private key (PKA, PKB), respectively, and the mobile agent (MA) being configured to provide the data (mB) within a nested structure which is encoded with the first server's private key (PKA) and which is to be decoded by the at least one second server (B) for access to the data (mB), the nested structure being built up on a combination of an unique number (r0) assigned to the mobile agent (MA), a secret symmetric key (SKo) which is assigned to the data (mB) to be protected and encoded with the second server's public key (KB), a data authentication code formed by an encryption of the secret key (SKo) and the first server's public key (KA) via a wrapping function (h), and the data (mB) encoded with the secret key (SKo).

12. The system according to claim 11, wherein the nested structure can be computed by the first server (A) which sends the mobile agent (MA) out.

13. The system according to claim 11, wherein the at least one second server (B) is able to register the unique number (r0) in a list of numbers thus keeping a check on the numbers that have already been used.

14. The system according to claim 11, wherein the wrapping function (h) is a hash function.

15. The system according to claim 11, wherein the nested structure to be decoded for access to the data (mB) is defined as follows:

[PA,r0,{SKo}KB,h(KA,SKo),{mB}SKo]PKA wherein PA is a agent's program code, r0 is the unique number, SKo is the secret key, KB is the second server's public key, h is the wrapping function, KA is the first server's public key, PKA is the first server's private key and mB is the data to be protected.

16. The system according to claim 11, wherein the unique number (r0) is used only once and is calculated on basis of a program code (PA) of the mobile agent (MA).

17. The system according to claim 16, wherein the program code (PA) of the mobile agent (MA) is maintained in a Java Archive file (JAR).

18. The system according to claim 17, wherein the Java Archive file (JAR) is signed by the first server's private key (PKA).

19. The system according to claim 17, wherein the Java Archive file (JAR) contains the unique number (r0) assigned to the mobile agent (MA).

20. The system according to claim 15, wherein the complete structure to be decoded is defined as follows:

[PA,r0]PKA+[r0,{SKo}KB,h(KA,SKo),{mB}SKo]PKA wherein PA is the agent's program code, r0 is the unique number, SKo is the secret key, KB is the second server's public key, h is the wrapping function, KA is the first server's public key, PKA is the first server's private key and mB is the data to be protected.

21. The system according to claim 15, wherein the agent's program code (PA) and the data of the mobile agent (MA) are serialized separately.

22. A system comprising:

a mobile agent of a first server configured to provide a protected transfer of data which are intended for at least one second server within a network system against an attack and an unauthorized access, the first server (A) and the at least one second server (B) being associated with a pair of a public key (KA, KB) and a private key (PKA, PKB), respectively, the mobile agent (MA) further configured to provide the data within a nested structure which is encoded with the first server's private key (PKA) and which has to be decoded by the at least one second server (B) for access to the data (mB), the nested structure being built up on a combination of an unique number (r0) assigned to the mobile agent (MA), a secret symmetric key (SKo) which is assigned to the data (mB) to be protected and encoded with the second server's public key (KB), a data authentication code formed by an encryption of the secret key (SKo) and the first server's public key (KA) via a wrapping function, and the data (mB) encoded with the secret key (SKo).

23. The mobile agent according to claim 22, wherein the nested structure can be computed by the first server as the agent's owner which sends the mobile agent (MA) out.

24. The mobile agent according to claim 22, wherein the wrapping function is a hash function.

25. The mobile agent according to claim 22, wherein the nested structure to be decoded for access to the data is defined as follows:

[PA,r0,{SKo}KB,h(KA,SKo),{mB}SKo]PKA wherein PA is a agent's program code, r0 is the unique number, SKo is the secret key, KB is the second server's public key, h is the wrapping function, KA is the first server's public key, PKA is the first server's private key and mB is the data to be protected.

26. The mobile agent according to claim 22, wherein the unique number (r0) is used only once and is calculated on basis of a program code (PA) of the mobile agent (MA).

27. The mobile agent according to claim 26, wherein the program code (PA) of the mobile agent (MA) is maintained in a Java Archive file (JAR).

28. The mobile agent according to claim 27, wherein the Java Archive file is signed by the first server's private key (PKA).

29. The mobile agent according to claim 27, wherein the Java Archive file (JAR) contains the unique number (r0) assigned to the mobile agent (MA).

30. The mobile agent according to claim 22, wherein the complete structure to be decoded is defined as follows:

[PA,r0]PKA+[r0,{SKo}KB,h(KA,SKo),{mB}SKo]PKA wherein PA is the agent's program code, r0 is the unique number, SKo is the secret key, KB is the second server's public key, h is the wrapping function, KA is the first server's public key, PKA is the first server's private key and mB is the data to be protected.

31. The mobile agent according to claim 22, wherein the agent's program code (PA) and the data of the mobile agent (MA) are serialized separately.

32. A computer program product having a non-transitory computer-readable storage medium and a computer program stored on the non-transitory computer-readable storage medium with a program code which is suitable for carrying out a method comprising:
  choosing, at a first server, a unique number (r0) and assigning it to a mobile agent (MA);
  choosing a secret symmetric key (SKo) and assigning it to data (mB) to be protected;
  encoding the secret key (SKo) with a public key (KB) of a second server (B);
  encrypting the secret key (SKo) and a public key (KA) of the first server via a wrapping function (h), thus forming a data authentication code (h(KA, SKo));
  encoding the data (mB) with the secret key (SKo);
  combining the unique number (r0), the encoded data ({mB} SKo), the encoded secret key({SKo} KB) and the data authentication code (h(KA, SKo)); and
  encoding that combination with the private key (PKA) of the first server (A) to form a nested structure to be decoded successively for access to the data (mB).

33. A non-transitory computer-readable storage medium with a computer program stored thereon, the computer program comprising a program code which is suitable for carrying out a method comprising:
  choosing, at a first server, a unique number (r0) and assigning it to a mobile agent (MA);
  choosing a secret symmetric key (SKo) and assigning it to data (mB) to be protected;
  encoding the secret key (SKo) with a public key (KB) of a second server (B);
  encrypting the secret key (SKo) and a public key (KA) of the first server via a wrapping function (h), thus forming a data authentication code (h(KA, SKo));
  encoding the data (mB) with the secret key (SKo);
  combining the unique number (r0), the encoded data ({mB}SKo), the encoded secret key({SKo}KB) and the data authentication code (h(KA, SKo)); and
  encoding that combination with the private key (PKA) of the first server (A) to form a nested structure to be decoded successively for access to the data (mB).

* * * * *